United States Patent [19]
Gooding et al.

[11] 3,815,225
[45] June 11, 1974

[54] METHOD OF MAKING AN ADJUSTABLE ELECTRICAL COMPONENT

[75] Inventors: Trevor Frank John Gooding, Guildford; Geoffrey David Stuart Howse, Farnborough, both of England

[73] Assignee: Electrosil Limited, Pallion, Sunderland, England

[22] Filed: Dec. 18, 1972

[21] Appl. No.: 316,297

Related U.S. Application Data
[62] Division of Ser. No. 192,385, Oct. 26, 1971, Pat. No. 3,735,326.

[52] U.S. Cl. ................................. 29/613, 29/619
[51] Int. Cl. ........................ H01c 1/02, H01c 17/00
[58] Field of Search ...... 29/619, 610, 613; 338/118, 338/183, 160, 184, 164, 199, 176, 180

[56] References Cited
UNITED STATES PATENTS

| | | | |
|---|---|---|---|
| 3,302,155 | 1/1967 | Layland | 338/164 X |
| 3,387,247 | 6/1968 | Mishler | 338/184 X |
| 3,414,862 | 12/1968 | Ginsberg | 338/180 |
| 3,569,897 | 3/1971 | Laube et al. | 338/183 |
| 3,641,664 | 2/1972 | Kirkendall | 29/613 X |

Primary Examiner—Charles W. Lanham
Assistant Examiner—Victor A. DiPalma
Attorney, Agent, or Firm—Waters, Roditi, Schwartz & Nissen

[57] ABSTRACT

A method of making an adjustable electrical component having a casing, through an aperture in which is accessible a lead screw member by which the component can be adjusted. The method includes the provision of two support portions one defining a hole and the other a recess having an open side and disposing an end region of the lead screw member in said hole. The other end region of the lead screw member is engaged in the aperture of the casing so that the lead screw member is at an angle to its operating position. There is then effected the relative moving of the casing and the support portions to place the support portions within the casing and to pivot said adjusting member to its operating position in the recess.

3 Claims, 2 Drawing Figures

PATENTED JUN 11 1974   3,815,225

METHOD OF MAKING AN ADJUSTABLE ELECTRICAL COMPONENT

OTHER APPLICATIONS

This application is a divisional of copending application Ser. No. 192,385 filed Oct. 26, 1971, now U.S. Pat. No. 3,735,326 issued May 22, 1973.

BACKGROUND OF THE INVENTION

This invention relates to method of making adjustable electrical components, and particularly variable resistors, such as trimming potentiometers.

In the field of adjustable electrical components, there is a need at present for miniaturization which creates problems by virtue of the need to have easy means of assembly of simple parts while retaining adequate adjustability and the effective sealing of these parts from the environment.

It is an object of the invention to provide a method for making such a sealed component which can conveniently be made in miniature form, e.g., with a maximum casing dimension of no more than two or two and a half centimeters.

SUMMARY OF THE INVENTION

According to one aspect of the present invention, there is provided a method for making an adjustable electrical component which is contained in a casing and which includes a rotatable adjusting member rotatable by way of an aperture defined by the casing, there being a resilient annular sealing member acting between an annular internal casing wall portion surrounding said aperture and an annular surface axially fixed relatve to the adjusting member to seal around said aperture, the annular wall portion and the annular surface providing facing sealing surfaces each extending away from the axis of the adjusting member such that the sealing member will oppose by compression a force on the adjusting member along its axis in a direction from the interior to the exterior of the casing through the aperture.

The sealing member, being resilient, takes up play or float in the adjusting member and also acts as a friction coupling between the adjusting member and the casing more reliably to maintain an adjusted condition of the component and thus to oppose the effect of vibration on the adjusted condition. Preferably, the casing is of metal, especially in view of cost advantage.

It will be seen that the component may therefore comprise a support on which the component parts are mounted so as to provide an electrically complete adjustable electrical component before the addition of the casing and before sealing. Thus, electrical tests can be carried out before completion of assembly, thereby saving assembly costs as defective components can be identified at an early stage.

The adjustable electrical component may comprise a resilient sliding contact mounted on a carriage which is urged by the sliding contact into coaction with the adjusting member, the arrangement being such that, when the carriage reaches an end position, further operation of the adjusting member in a sense tending to drive the carriage beyond the end position causes displacement of the carriage in a direction out of driving coaction with the adjusting member against the resilience of the contact without substantially modifying the electrical contact position of the contact.

The carriage may be slidable towards and away from the adjusting member and contain a channel loosely to receive that member, the channel having a series of ribs normally to make screw-threaded engagement with the adjusting member, but to ride over the threads of the adjusting member when an attempt is made to adjust beyond an end position. Preferably, the channel is of trough form and the series of ribs extends along the base of the trough.

According to a second aspect of the invention, there is provided a method for making an adjustable electrical component which is contained in a casing and which includes a rotatable adjusting member rotatable by way of an aperture defined by the casing, the member being supported by spaced supporting means, one defining a hole to receive the adjusting member and the other defining a recess having an open side such that, during assembly, the adjusting member can be placed in said hole at an angle to its operating position and then be pivoted into its operating position in said recess.

In this case, the assembly of the adjusting member is facilitated and it can also assist in putting the casing into position as the adjusting member can be displaced as necessary to allow the casing to be applied without damaging the component. Moreover, if the adjusting member is supported by a single moulding, moulding is facilitated by the provision of the recess with an open side.

According to a third aspect of the invention, there is provided a method of assembling a component according to the second aspect, wherein the adjusting member has one end region disposed in said hole and has its other end region engaged by the aperture of the casing so that the adjusting member is at an angle to its operating position, and wherein the casing is then moved over the component so as simultaneously to pivot the adjusting member to its operating position in the recess.

DESCRIPTION OF DRAWING

For a better understanding of the invention, and to show how the same may be carried into effect, reference will now be made, by way of example, to the accompanying drawing in which.

Figure 1:
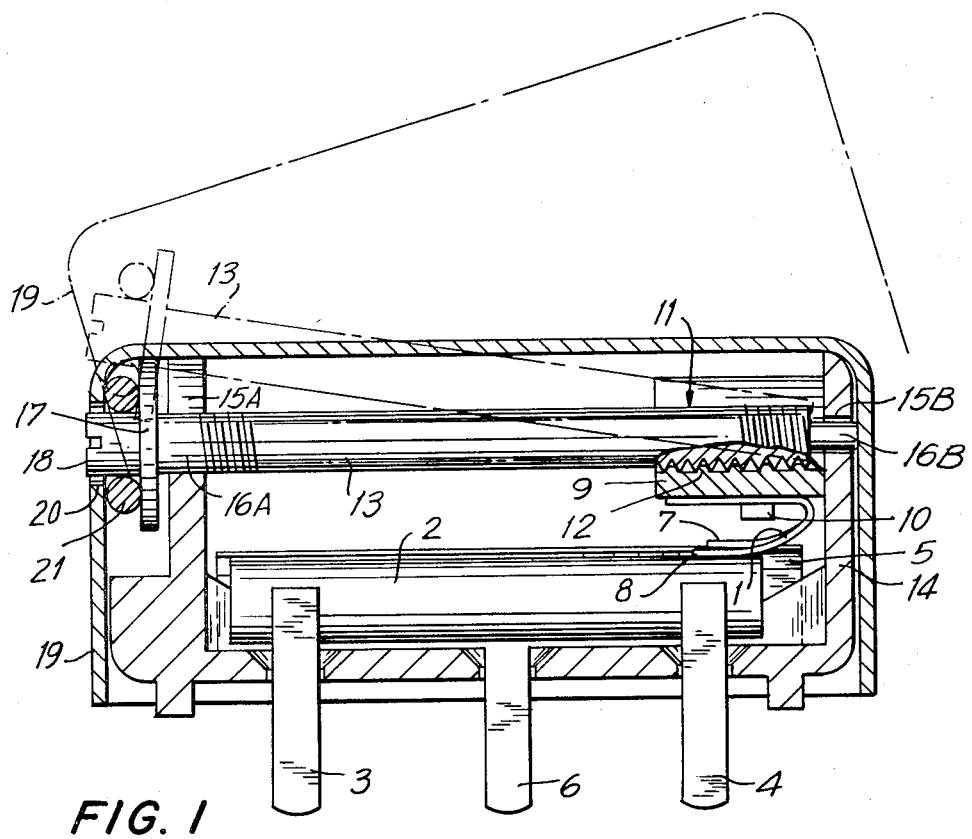
FIG. 1 is a cross-section of a trimmer potentiometer.

The Figures illustrate a trimmer potentiometer with a length of about three quarters of an inch and a height of about five sixteenths of an inch.

The potentiometer itself comprises a resilient conductive contact 1 and resistive member 2 of wirewound, film or other type, which is shown with a circular section but which may have another form, for example of rectangular section.

The resistive member has end leads 3 and 4, while the contact 1 runs on a plate or strip 5 having an integral lead 6.

The contact 1 has two integral limbs 7 and 8, one of which runs on the plate 5 and the other of which runs on the resistive member 2. The contact 1 is carried by a carriage 9 and is held thereto by being a force fit on, or by being staked on, projections 10 of the carriage.

Figure 2:
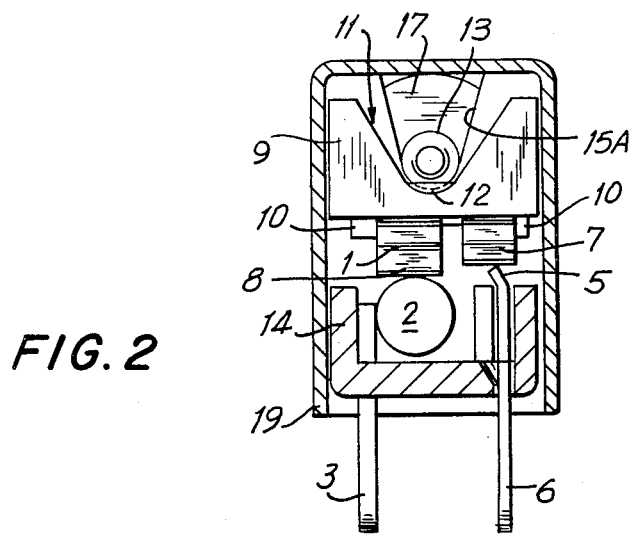
FIG. 2 is a cross-section at right angles to that of FIG. 1.

The carriage contains a trough 11 on the base of which is a series of, say, seven ribs which are mutually parallel and extend substantially at right angles to the direction of the series. One such rib is denoted 12 in FIG. 2.

An adjusting member or shaft 13, which is screw-threaded, runs in the trough, and the ribs 12 are resiliently urged by the contact 1 into screw-threaded engagement with the adjusting member 13.

The adjusting member 13 is freely supported for rotation by an insulated, moulded, support 14 which also carries the resistive member 2. More particularly, the support has opposed apertures 15A and 15B in which run smooth portions 16A and 16B of the adjusting member. A tone end the adjusting member has a flange 17 and a head 18, the latter being recessed to receive a screw driver or like means for imparting a drive to the member 13. It will be seen that the parts so far described constitute an electrically complete variable resistance.

These parts are disposed in a metal casing 19 and are sealed therein, for example by synthetic resin such as epoxy resin. The casing has an aperture 20 through which the head 18 may project slightly. Alternatively, the head may be within the space defined by the inner boundary of the casing so that a screw driver may be located and temporarily retained by the aperture 20. The carriage is slidably supported by the casing.

In the assembled state, as illustrated, an O-ring 21 exists between the casing portion encircling the aperture 20 and the flange 17, thereby providing a face-to-face seal which completes the sealing of the structure. This O-ring has two other important functions which are to take up the axial float of the adjusting member 13 and to act as a clutch or friction coupling tending to maintain any adjusted state of the potentiometer.

Another feature of this embodiment is that, when the member 13 is rotated to drive the carriage to an end position, one may continue to rotate the member 13 in the same sense without substantially changing its setting or damaging the devices.

Such continued rotation merely deflects the carriage downwardly against the resilience of the contact 1, causing the ribs 12 to ride on the screw-threads of the member 13.

It will be apparent from the drawing that the assembly of the potentiometer is simple, principally by virtue of the fact that the casing 19 is a separate member that is mounted after the electrically completed potentiometer has been formed. The member 2 and the plate or strip 5 are placed in position first with the leads 3, 4 and 6 extending through their respective apertures in the base of the support 14 and then the carriage 9 follows. The adjusting member 13 is then mounted by its portion 16B being inserted into the closed aperture 15B, which provides clearance as the member 13 has to be held at an angle during assembly before the other end portion 16A is dropped into the upwardly open aperture 15A. With the O-ring 21 in position and the member 13 at an angle, as shown by dotted lines in FIG. 1, the casing 19 is placed in the dotted line position so that the head of member 13 engages aperture 20. The casing is then slid over the assembly to its final position shown by full lines in FIG. 1, carrying with it the member 13.

In cases when the head remains within the casing, preferably a removable plug fills the aperture 20 to present a smooth and continuous inner casing surface to the O-ring as it slides to its final position. The plug will then be removed and the resin sealing completed. It will be noted that apart from the friction of the O-ring, the end portion 16A cannot significantly shift upwardly in the aperture 15A because the flange 17 abuts or is closely adjacent the underside of the casing. Although the aperture 15A need not be open, a closed one would entail the adjusting member being screwed into position, free axial movement being impeded by the ribs 12.

As a further assembly step, prior to sealing, the casing may be filled with an inert, non-conductive liquid of high thermal conductivity and low surface tension, such as a fluorocarbon liquid. A range of such liquids is known by the trade name Flutec, and includes perfluoro-n-hexane, perfluoro-methylcyclohexane and perfluoro-(1,3-dimethylcyclohexane).

Finally, it has been noted above that, prior to adding the casing, an electrically complete potentiometer exists. The importance of this is that an electrical test may be carried out before encapsulation.

We claim:

1. A method of making an adjustable electrical component comprising a casing containing an electrical device having two portions one of which is movable relative to the other by means of a rotatable adjusting member carrying said one portion and rotatable by way of an aperture defined by the casing, the method comprising: the step of providing a supporting structure carrying the other portion of the electrical device and having two support portions one defining a hole and the other a recess having an open side; the step of disposing an end region of said member in said hole; the step of engaging the other end region of said member in said aperture of said casing so that said adjusting member is at an angle to its operating position; and the step of relatively moving said casing and said supporting structure so as to place the supporting structure inside the casing and simultaneously to pivot said adjusting member to its operating position in said recess.

2. A method as claimed in claim 1 comprising securing the casing to the supporting structure by deforming the casing.

3. A method of making an adjustable electrical component comprising a housing containing an electrical device having two portions one of which is movable relative to the other by means of a lead screw member accessible through an aperture defined in a casing member of said housing, the method comprising: providing said lead screw member with a sealing portion which defines an annular sealing surface extending at an angle to the axis of rotation of said lead screw member and which portion has a periphery enclosing an area greater than that of said aperture; coupling one of said portions of said electrical device to said lead screw member so that said one portion can be driven relative to the other of said portions by rotation of said lead screw member, providing a support member carrying said other portion and having two spaced supporting parts one defining a hole and the other a recess which is open in the direction at right angles to the axis of rotation of said lead screw member in its operative position; disposing one end region of said lead screw member in said hole; encircling the opposite end region of said lead screw member with an annular resilient sealing member, which opposite end is adjacent said sealing portion; engaging said opposite end region in said aperture of said casing member; and displacing said casing member over said support member so as (a) to pivot said lead screw member into said recess through its open side with said sealing portion at that side of said recess more remote from said one support part, (b) to close one side of said casing member with said support member, and (c) to compress said annular sealing member between said annular sealing surface and an inwardly facing portion of the inner wall of said casing member, which inwardly facing portion encircles said aperture.

* * * * *